United States Patent [19]

Sugita

[11] Patent Number: 5,555,049
[45] Date of Patent: Sep. 10, 1996

[54] DRIVING FORCE TRANSMISSION MECHANISM FOR USE IN A CAMERA

[75] Inventor: Yukihiko Sugita, Kokubunji, Japan

[73] Assignee: Olympus Optical Co., Ltd., Tokyo, Japan

[21] Appl. No.: 395,974

[22] Filed: Feb. 28, 1995

[30] Foreign Application Priority Data

Mar. 3, 1994 [JP] Japan ................... 6-033817

[51] Int. Cl.⁶ .................................................. G03B 1/18
[52] U.S. Cl. ............................................... 354/173.1
[58] Field of Search ............................... 354/173.1

[56] References Cited

FOREIGN PATENT DOCUMENTS

| 287547 | 6/1989 | Japan . |
|---|---|---|
| 359657 | 11/1992 | Japan . |
| 130763 | 1/1993 | Japan . |
| 321986 | 3/1993 | Japan . |

*Primary Examiner*—Monroe H. Hayes
*Attorney, Agent, or Firm*—Louis Weinstein

[57] ABSTRACT

A driving force transmission mechanism for a camera has a motor capable of rotational driving and axial driving. One of a plurality of driven gears is selected by axial movement of an output shaft of the motor, and a driving force is transmitted to the selected driven gear by rotational driving of the output shaft. In one embodiment, two pinions fixed to upper and lower ends of the output shaft are moved upward or downward so that one of the pinions is brought into engagement with one of the plurality of driven gears to drive a driven system. This driving force transmission mechanism has a simple construction but can selectively drive a plurality of drive systems without using a complicated changeover mechanism.

29 Claims, 6 Drawing Sheets

DRIVING FORCE TRANSMISSION MECHANISM FOR USE IN A CAMERA

BACKGROUND OF THE INVENTION

1. Field of the Invention

This invention relates to a driving force transmission mechanism for use in a camera and, more particularly, to a driving force transmission mechanism capable of transmitting a driving force by selecting driven systems provided in a camera.

2. Related Art Statement

Various driving force transmission mechanisms have been proposed which are arranged to selectively drive one of a plurality of driven systems in a camera by using one motor.

For example, Japanese Patent Laid-Open Publication No. 287547/1989 discloses a drive controller for a camera in which driving for shutter release, shutter change or changing operating ranges of a driving force transmission means is performed by rotating one motor in one direction, while driving for winding or rewinding a film is performed by rotating the motor in the other direction. In this controller, a torque of the motor is selectively transmitted to each of driven systems through a clutch mechanism.

The applicant of the present invention has also proposed a driving force transmission mechanism which is disclosed in Japanese Patent Laid-Open Publication No. 321986/1993. This mechanism is arranged to drive each of plural driven systems with one motor provided as a drive source in such a manner that one of driven gears for driving the plural drive mechanisms to be engaged with the motor is selected by the rotation of the motor in one direction through a planetary gear mechanism, and a torque is transmitted to the selected driven gear by the rotation of the motor in the other direction. The motor used in each of the above-mentioned conventional drive mechanisms is an ordinary motor having an output shaft always rotated at a fixed axial position.

Recently, single motor arrangements in which an output shaft can be operated for both rotational driving and axial movement have been proposed.

For example, Japanese Patent Laid-Open Publication No. 359657/1992 discloses a motor which has, as shown in a longitudinal sectional view of FIG. 9 of the present invention, a stator having plural stator coils 101, 102, and 103 arranged in an axial direction in a motor body 100, an output shaft 104 rotatable and axially movable, and a rotor 105 formed integrally with this shaft. For motor driving, at least one of the plurality of coils 101, 102, and 103 is energized. By changing the energized coil, the rotor 105 is caused to rotate and move along the axial direction. The output shaft 104 can be moved to set its leading end at each of positions 104A, 104B, and 104C, as shown in FIG. 9.

Japanese Patent Laid-Open Publication No. 130763/1993 also discloses a motor having a structure of the same type. This type of motor capable of performing rotational driving and axial driving of the output shaft will hereinafter be referred to as "an output shaft position changeable motor".

The camera drive controller disclosed in Japanese Patent Laid-Open Publication No. 287547/1989 uses an ordinary type motor as mentioned above and requires a clutch having a complicated construction because a torque of a pinion at a fixed axial position is transmitted by changing a transmission route to a plurality of driven gear. This drive controller therefore occupies a large space in the camera and requires a large number of component parts.

The driving force transmission mechanism disclosed in Japanese Patent Laid-Open Publication No. 321986/1993 also uses an ordinary type motor as in the above-mentioned drive controller and requires a changeover planetary gear mechanism although its does not require a complicated clutch mechanism. Accordingly, this driving force transmission mechanism also occupies a large space and requires a large number of component parts.

In each of the above-described controllers and mechanisms, the drive system changeover mechanism cannot be simply constructed since an output shaft position changeable motor such as that mentioned above is not used.

SUMMARY AND OBJECTS OF THE INVENTION

An object of the present invention is to provide a driving force transmission mechanism for a camera which does not require a complicated changeover mechanism, which has a simpler construction, and which can selectively drive a plurality of driven systems.

To achieve this object, according to the present invention, there is provided a driving force transmission mechanism for a camera comprising an electric drive source having an output shaft capable of being maintained at least at two positions in its axial direction and rotatable on its axis at each position, axial position control means for determining moved positions of the output shaft of the electric drive source, and driven means disposed at the axial positions of the output shaft of the electric drive source and capable of being driven by receiving a torque of the rotation of the electric drive source. The abovementioned driven means drives, for example, a zooming mechanism and a film feed mechanism of the camera.

These and other objects, features and advantages of the present invention will become more apparent from the following detailed description of the invention.

DESCRIPTION OF THE PREFERRED EMBODIMENTS

Figure 1:
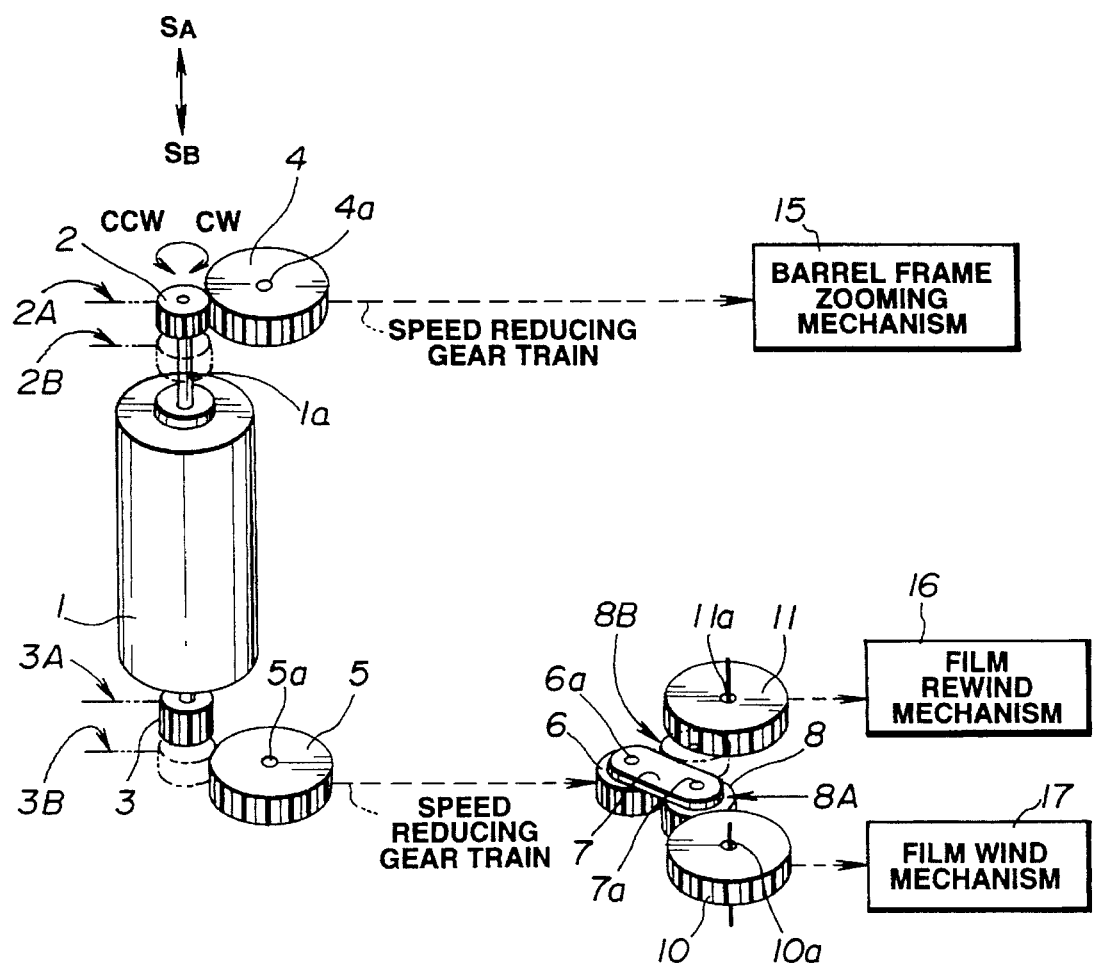
FIG. 1 is a perspective view of a driving force transmission mechanism for a camera in accordance with a first embodiment of the present invention.

The preferred embodiments of the present invention will be described with reference to the accompanying drawings.

The construction of a driving force transmission mechanism of a camera in accordance with the first embodiment of the present invention will be described with reference to FIG. 1.

The driving force transmission mechanism is arranged to drive a plurality of driven systems, i.e., a barrel frame zooming mechanism 15 provided as a lens barrel driving mechanism, a film rewinding mechanism 16 and a film winding mechanism 17 provided as film feed mechanisms by selecting one of these mechanisms.

A motor 1 is provided as an electric drive source is an output shaft position changeable motor of the abovementioned type capable of rotational driving and axial driving of its output shaft 1a (see FIGS. 1 and 2) and reversible with respect to rotational direction. The output shaft 1a extends axially through a body of the motor and projects through both ends of the motor body. A coil is incorporated in the motor and an electric current passed through the coil is changed to move the output shaft 1a in an upward direction SA and a downward direction SB, as viewed in FIG. 1.

A pinion 2 provided as a coupling means and as a first output gear is fixed to an upper portion of the output shaft 1a, while a pinion 3 also provided as a coupling means and as a second output gear is fixed to a lower portion of the output shaft 1a. When the output shaft 1a is moved in the direction SA or SB of FIG. 1, the pinions 2 and 3 are moved to first positions 2A, 3A or second positions 2B, 3B.

When the output shaft 1a of the motor 1 is moved in the upward direction SA of FIG. 1 to shift the pinion 2 to the position 2A and the pinion 3 to position 3A, the pinion 2 is set in a state of meshing with a driven gear 4 axially supported on a support shaft 4a while the pinion 3 is set in a state of not meshing with (i.e. axially displaced) from a driven gear 5 axially supported on a support shaft 5a.

When the output shaft 1a of the motor 1 is moved in the downward direction SB of FIG. 1 to shift the pinion 2 to the position 2B and the pinion 3 to the position 3B, the pinion 2 is set in a state of not meshing with (i.e. axially displaced) the driven gear 4 while the pinion 3 is set in a state of meshing with the driven gear 5.

A torque of the driven gear 4 is transmitted through a speed reducing gear train to the zooming mechanism 15 which is one of the plurality of driven systems, and which drives a lens barrel of a picture taking lens for perform zooming.

On the other hand, a torque of the driven gear 5 is transmitted through a speed reducing gear train to a sun gear 6 axially supported on a support shaft 6a.

The support shaft 6a which supports the sun gear 6 also supports a gear arm 7, which is rotatable about the same center as the sun gear 6. A pin 7a is embedded in the gear arm 7 at one end. A planetary gear 8 is axially attached to the pin 7a to mesh with the sun gear 6, thereby forming a planetary gear mechanism. The planetary gear 8 has a small friction with the gear arm 7 and is capable of revolving in the direction corresponding to the direction of rotation of the sun gear 6.

When the planetary gear 8 revolves clockwise (in the direction CW), it is brought into engagement with a gear 10 which is axially supported on a support shaft 10a. When the planetary gear 8 revolves counterclockwise (in the direction CCW), it is brought into engagement with a gear 11 which is axially supported on a support shaft 11a.

A torque of the gear 10 is transmitted to the film winding mechanism 17, which is one of the plurality of driven systems, while a torque of the gear 11 is transmitted to the film rewinding mechanism 16.

Figure 2:
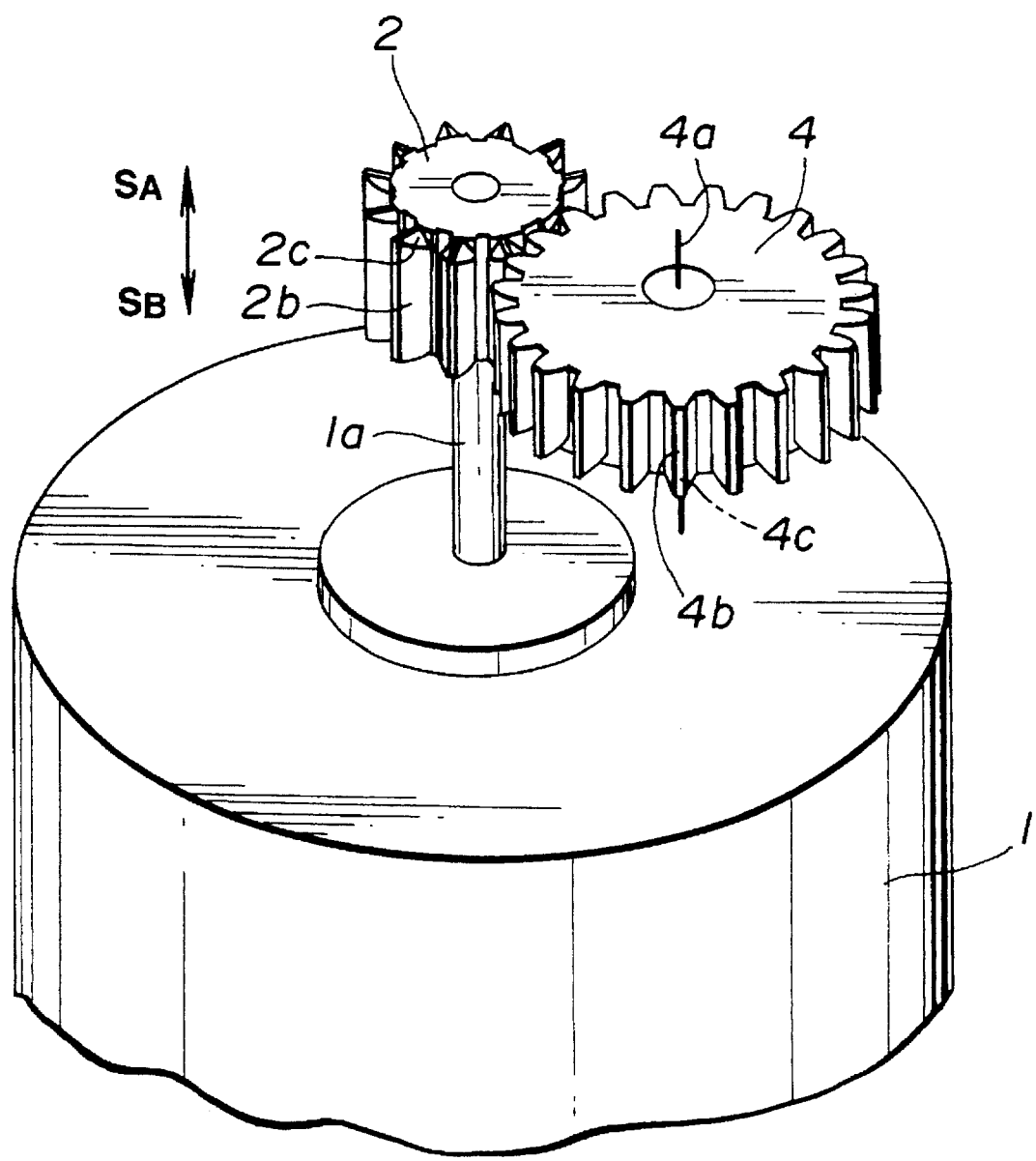
FIG. 2 is an enlarged perspective view of a portion including a pinion and a driven gear in the driving force transmission mechanism shown in FIG. 1.
Figure 3:
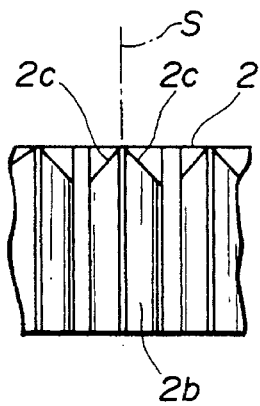
FIG. 3 is a development of teeth of the pinion used in the driving force transmission mechanism shown in FIG. 1.

FIG. 2 is an enlarged perspective view of a portion including the pinion 2 and the driven gear 4 in the mechanism shown in FIG. 1, and FIG. 3 is a development of the external configuration of a toothed portion of the pinion 2.

Slanted surfaces 2c are formed on each of teeth 2b of the pinion 2 at the upper end of the same as viewed in FIG. 3 in order that the pinion 2 can be smoothly brought into engagement with the driven gear 4 when the output shaft 1a of the motor 1 slides in the axial direction SA. Similarly, slanted surfaces 4c are formed at the lower ends of teeth 4b of the gear 4 so as to face the slanted surfaces 2c when these gears are brought into engagement with each other. The slanted surfaces 2c, 4c are formed so as to have a roof-like configuration by cutting each tooth end surface along two planes which meet each other at a center of the end surface in the direction of the width thereof, and which are inclined with respect to the axial direction S.

Slanted surfaces are also formed in the same manner at cooperating end surfaces of the teeth of the pinion 3 and the gear 5 which face each other when these gears are engaged.

The operation of the thus-constructed driving force transmission mechanism of the camera of this embodiment will now be described.

When the barrel frame of the picture taking lens is moved for zooming, the output shaft 1a of the motor 1 is caused to slide in the direction SA to move the pinion 2 to the position 2A at which the pinion 2 meshes with the driven gear 4 (see FIG. 1). In this meshing state, the output shaft 1a of the motor 1 is rotated in the direction CW or CCW for zoom-up or zoom-down operation of the picture taking lens barrel. In this state, the pinion 3 fixed to the lower end of the output shaft 1a does not mesh with the driven gear 5 since it is at the position 3A and in the state of being disengaged (i.e. axially displaced) from the driven gear 5 in the thrust direction.

To perform film winding or rewinding operation, the output shaft 1a of the motor 1 is caused to slide in the direction SB to move the pinion 3 to the position 3B at which the pinion 3 meshes with the driven gear 5. This state corresponds to the meshing state of the pinion 3 indicated by the double-dot-dash line in FIG. 1. At this time, the pinion 2 does not mesh with the driven gear 4 since it has been moved to the position 2B and in the state of being disengaged (i.e. axially displaced) from the gear 4 in the thrust direction.

In this meshing state, the output shaft 1a of the motor 1 is rotated in the direction CW or CCW to drive the film feed mechanism.

That is, when the film winding operation is performed, the output shaft 1a is rotated so that the sun gear 6 rotates in the direction CW. The planetary gear 8 revolves thereby to a rotating position 8A to mesh with the gear 10 and to drive the film winding mechanism 17 by rotating the gear 10.

When the film rewinding operation is performed, the output shaft 1a is rotated so that the sun gear 6 rotates in the direction CCW. The planetary gear 8 revolves thereby to a rotating position 8B to mesh with the gear 11 and to drive the film rewinding mechanism 16 by rotating the gear 11.

When the output shaft 1a is moved in the direction SA or SB to bring the pinion 2 or 3 and the driven gear 4 or 5 into engagement, these gears can be directly brought into full engagement with each other if the pinion 2 and the driven gear 4 or the pinion 3 and the driven gear 5 are in such a phase relationship that their corresponding teeth do not interfere with each other. These gears cannot be directly brought into engagement with each other if they are in such a phase relationship that their corresponding teeth interfere with each other fully or slightly. However, as the pinion 2 or 3 rotates thereafter, an urging force in the direction SA or SB parallel to the axial direction of the gear acts between the slanted surfaces 2c and 4c of the pinion 2 and the driven gear 4 or between the like slanted surfaces of the pinion 3 and the driven gear 5 to enable these gears to rotate relatively to the fully engaging position.

For convenience's sake, the configuration and the operation of an electric circuit for controlling the driving force transmission mechanism of this embodiment will be described below along with the operation of controlling a driving force transmission mechanisms in accordance with the second embodiment of the present invention.

As described above, in the driving force transmission mechanism of the camera of this embodiment, the output shaft position changeable motor 1 is applied as a drive source to make it possible to select the driven gear 4 or 5 only by controlling the position of the output shaft 1a in the axial direction.

There is, therefore, no need for special transmission means such as those of the conventional driving force transmission mechanism, i.e., a planetary gear mechanism to which a motor drive system is connected to select driven gears and a control section for controlling such a planetary gear mechanism. The number of components parts of the driving force transmission mechanism and the space occupied by component parts are therefore reduced. Further, each of the driven gears can be selected reliably because the control operation is simplified as described below.

A driving force transmission mechanism for a camera in accordance with the second embodiment of the present invention will next be described.

Figure 4:
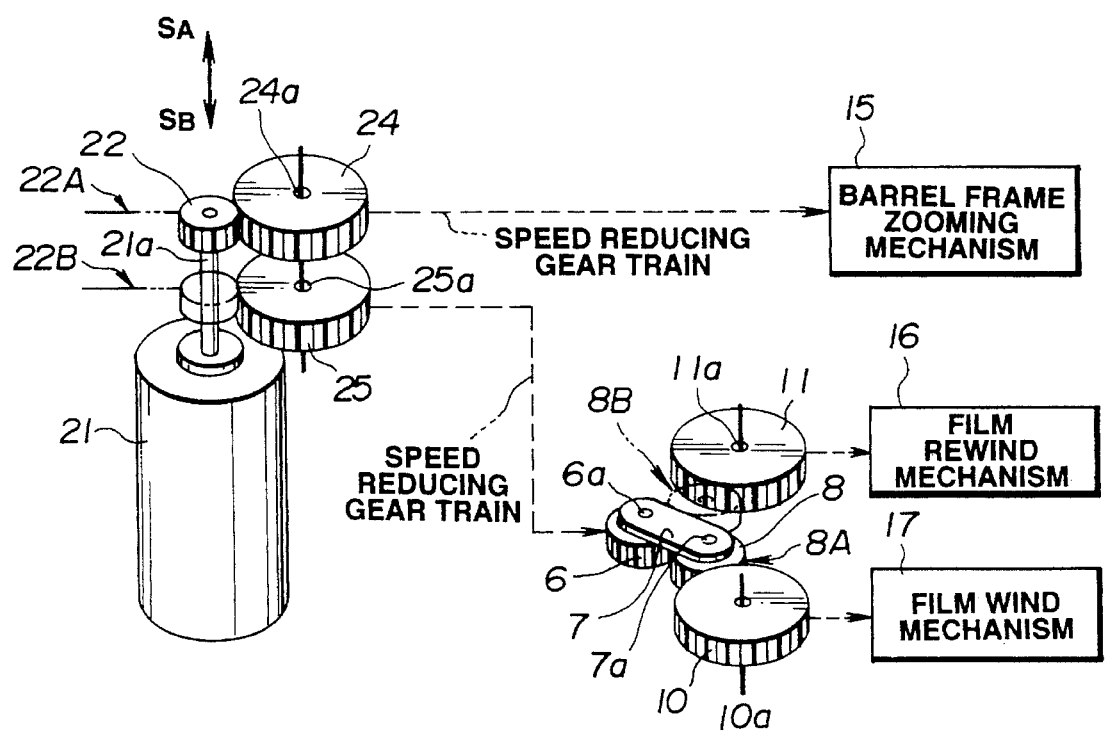
FIG. 4 is a perspective view of a driving force transmission mechanism for a camera in accordance with a second embodiment of the present invention.

FIG. 4 is a perspective view of the driving force transmission mechanism of this embodiment.

The mechanism of this embodiment is constructed to selectively drive a plurality of driven systems, i.e., a barrel frame zooming mechanism 15, a film rewinding mechanism 16 and a film winding mechanism 17, as in the case of the above-described first embodiment. A motor 21 provided as a drive source for this mechanism is also of the output shaft position changeable type capable of rotating the output shaft in normal and reverse directions and capable of axially moving the output shaft.

The mechanism of this embodiment, however, differs from that of the first embodiment in that only one pinion 22 provided as an output gear is fixed to an output shaft 21a which projects on one side of the motor 21 (on the upper side as viewed in FIG. 4), and that first and second driven gears 24, 25 with which the pinion 22 can mesh are disposed on the same side of the motor 21.

Other components of the mechanism of this embodiment are the same as those of the first embodiment described above, and are indicated by the same reference characters in FIG. 4. Such components will not particularly be described.

In the mechanism of this embodiment, when the output shaft 21a of the motor 21 slides in the direction SA of FIG. 4, the pinion 22 is set at a first position 22A to mesh with the first driven gear 24 which is axially supported on a support shaft 24a.

When the output shaft 21a of the motor 21 slides in the direction SB of FIG. 4, the pinion 22 is set at a second position 22B to mesh with the second driven gear 25 which is axially supported on a support shaft 25a. This state corresponds to the meshing state of the pinion indicated by the double-dot-dash line in FIG. 4.

A torque of the gear 24 is transmitted to the zooming mechanism 15 for moving the picture taking lens barrel through a speed reducing gear train, as in the case of the first embodiment.

A torque of the gear 25 is transmitted through a speed reducing gear train to drive a sun gear 6. The film rewinding mechanism 16 or the film winding mechanism 17 is selected according to the direction of rotation of the sun gear 6 to transmit a torque to the selected mechanism in the same manner as the first embodiment.

Figure 5:
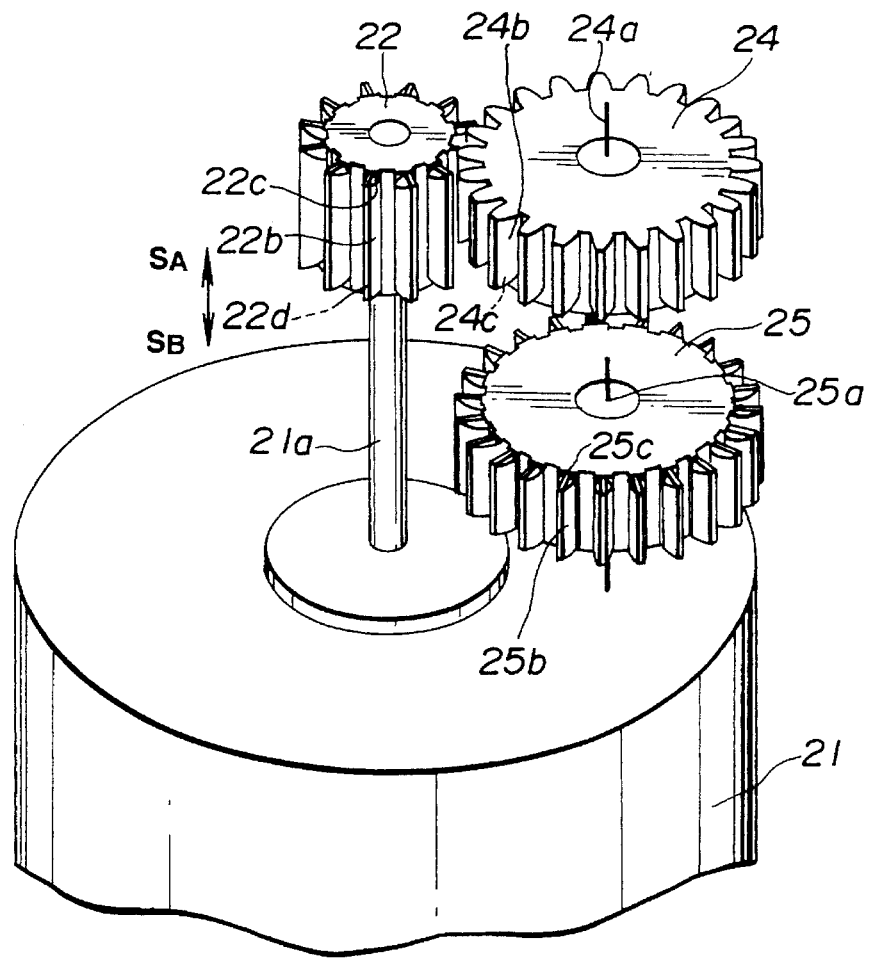
FIG. 5 is an enlarged perspective view of a portion including a pinion and driven gears in the driving force transmission mechanism shown in FIG. 4.
Figure 6:
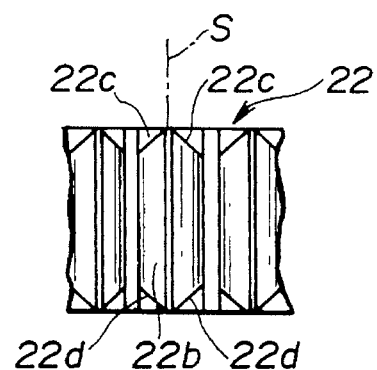
FIG. 6 is a development of teeth of the pinion used in the driving force transmission mechanism shown in FIG. 4.

FIG. 5 is an enlarged perspective view of a portion including the pinion 22 and the driven gears 24 and 25 in the mechanism shown in FIG. 4, and FIG. 6 is a development of a toothed portion of the pinion 22.

Slanted surfaces 22c, 22d for smooth teeth engagement are formed on each of teeth 22b of the pinion 22 at the upper and lower ends of the same, respectively, as viewed in FIG. 6, by being inclined with respect to the axial direction S so as to have a roof-like configuration.

On the other hand, slanted surfaces 24c, 25c also provided for smooth teeth engagement are formed as end surfaces of the teeth of the first and second driven gears 24 and 25 meshing with the pinion 22, i.e., lower end surfaces of teeth 24b of the first driven gear 24 and upper end surfaces of teeth 25b of the second driven gear 25, respectively, by being inclined with respect to the axial direction S. The slanted surfaces 24c, 25c have a similar roof-like configuration opposed to that of the slanted surfaces 22c, 22d of the pinion 22.

The operation of the thus-constructed driving force transmission mechanism of the camera of this embodiment will now be described.

When the barrel frame of the picture taking lens is moved for zooming, the output shaft 21a of the motor 21 is caused to slide in the direction SA to bring the pinion 22 into engagement with the driven gear 24 (see FIG. 4). When this changeover engagement operation is performed, the slanted surfaces 22c, 24c, provided on the pinion 22 and the driven gear 24, function effectively for smooth engagement therebetween, as in the case of the first embodiment. In this state, the pinion 22 does not mesh with the driven gear 25 since it is in the state of being disengaged (i.e. axially displaced) from the driven gear 25 in the thrust direction.

In this meshing state, the output shaft 21a of the motor 21 is rotated in the direction CW or CCW to perform the zoom-up or zoom-down operation of the picture taking lens barrel frame by the zooming mechanism 15.

To perform a film winding or rewinding operation, the output shaft 21a of the motor 21 is caused to slide in the direction SB to bring the pinion 22 into engagement with the driven gear 25. This state corresponds to the meshing state of the pinion indicated by the double-dot-dash line in FIG. 4. When this changeover engagement operation is performed, the slanted surfaces 22d, 25c,, provided on the pinion 22 and the driven gear 25, function effectively for smooth engagement therebetween, as in the case of the first embodiment. In this state, the pinion 22 does not mesh with the driven gear 24 since it is in the state of being disengaged from the driven gear 24 in the thrust direction.

Under this condition, the output shaft 21a of the motor 21 is rotated to drive the film feed mechanism.

The operation of driving the film feed mechanism is performed in the same manner as in the first embodiment. To perform the film winding operation, the output shaft 21a is rotated so that the sun gear 6 rotates in the direction CW. The planetary gear 8 revolves thereby to a rotating position 8A to mesh with the gear 10 and to perform the winding operation by rotating the gear 10.

To perform the film rewinding operation, the output shaft 21a is rotated so that the sun gear 6 rotates in the direction CCW. The planetary gear 8 revolves thereby to a rotating position 8B to mesh with the gear 11 and to perform the film rewinding operation by rotating the gear 11.

The driving force transmission mechanism of this embodiment has a feature of having only one output gear as well as the feature of the mechanism of the first embodiment, with a result that the mechanism space is further reduced.

That is, the pinion provided as an output gear is fixed to the upper end of the output shaft 21a of the motor 21, and the first and second driven gears 24, 25 to be brought into engagement with the pinion 22 are disposed on the upper side of the motor 21, so that these gears and subsequent gear trains can be collectively arranged in one place.

An electric circuit for controlling the above-described driving force transmission mechanisms of the first and second embodiments and the control operation of this circuit will next be described. The mechanisms of the first and second embodiments are controlled by substantially the same electric control circuit, and operating components of the control circuit will first be described with respect to the first and second embodiments.

Figure 7:
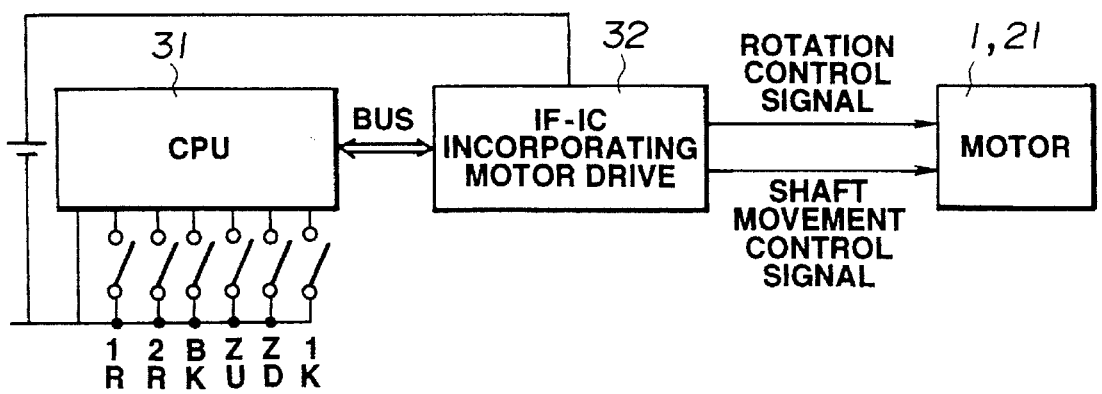
FIG. 7 is a block diagram of an electric circuit for controlling the driving force transmission mechanism of the first or second embodiment shown in FIG. 1 or 4.

FIG. 7 shows a diagram of the electric circuit for the driving force transmission mechanisms of the first and second embodiments.

The electric circuit is mainly formed of a central processing unit (CPU) 31 provided as control means for controlling controlled elements, an interface integrated circuit (hereinafter referred to as "IF-IC") 32 incorporating a motor driver, motor 1 or 21 having rotational and axially-moving motions and provided in the mechanism of the first or second embodiment, and a group of operating switches having output lines connected to the CPU 31.

As shown in FIG. 7, the group of operating switches is constituted of switches 1R, 2R, BK, ZU, ZD, and 1K, which are operating instruction signal input switches connected to the CPU 31. The switch 1R is a first release switch or a photometry or distance-measuring timing switch. The switch 2R is a second release switch or an exposure switch. The switch BK is a switch for detection of back lid opening or closing. The switch ZU is a zoom-up switch. The switch ZD is a zoom-down switch. The switch 1K is a switch for detection of an amount of feeding by which one frame of a film is fed.

The CPU 31 controls the IF-IC 32 incorporating the motor driver through a bus on the basis of signals from these switches to output a shaft movement control signal and a rotation control signal to the motor 1 or 21 for control of axial-movement and rotational driving of the output shaft 1a or 21a.

Figure 8:
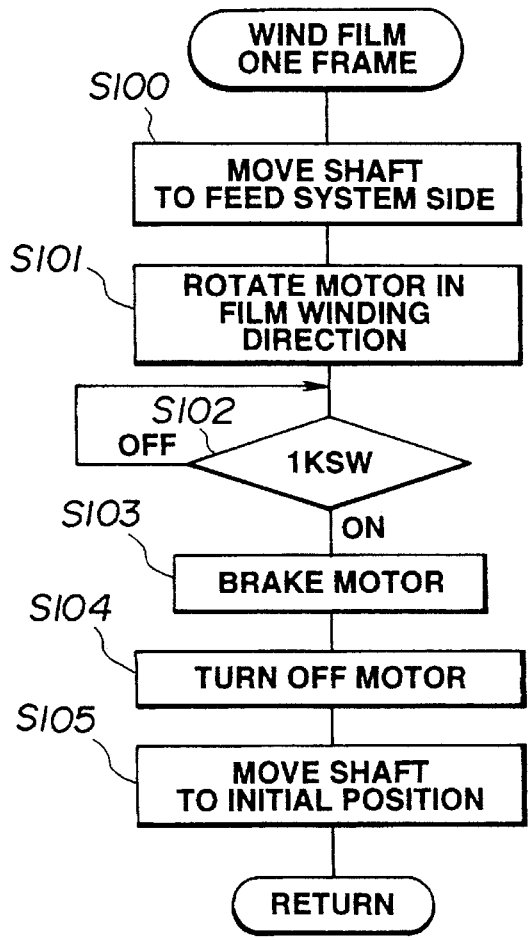
FIG. 8 is a flowchart of the process of winding a film one frame in the operation of controlling the driving force transmission mechanism of the first or second embodiment shown in FIG. 1 or 4.
Figure 9:
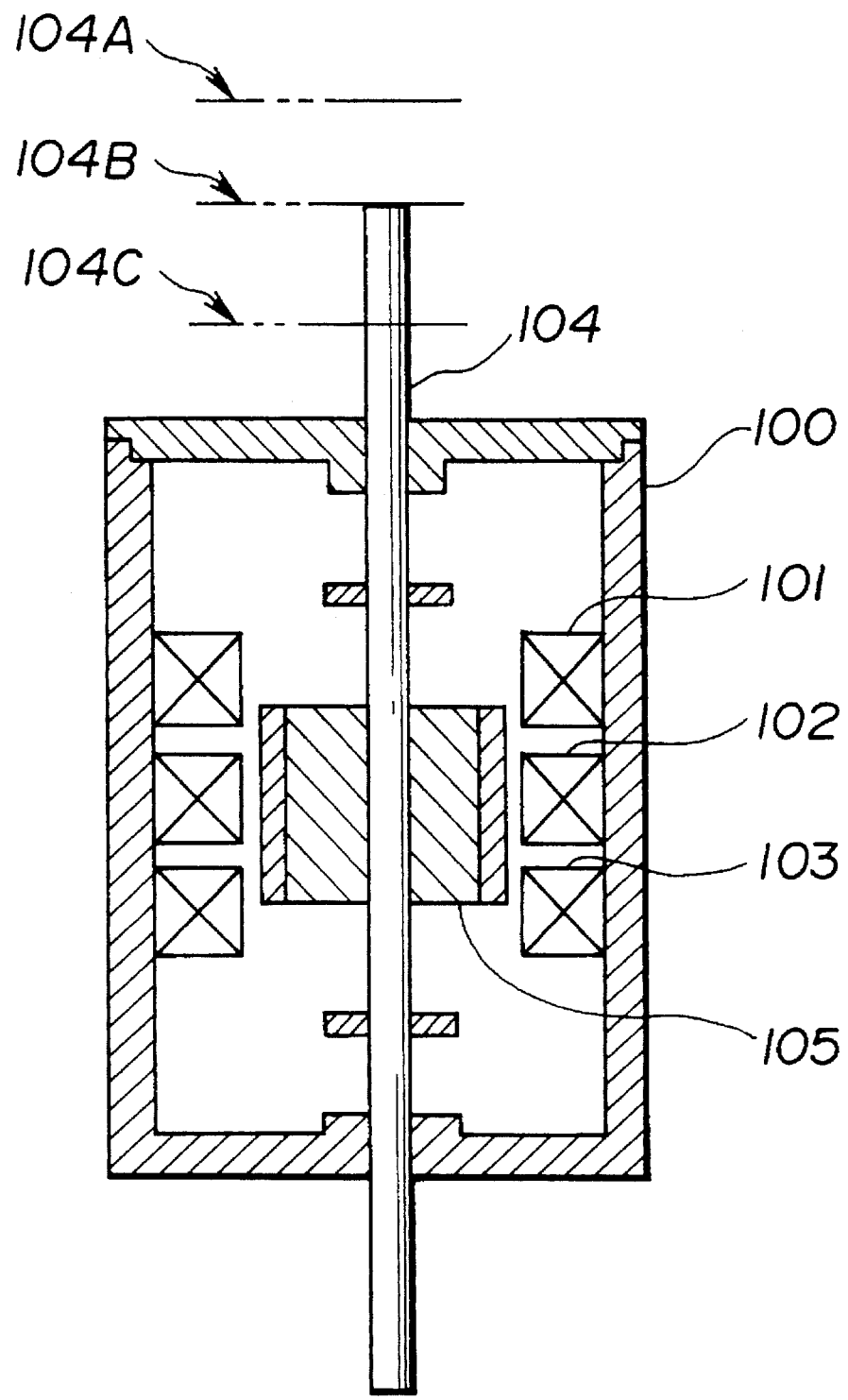
FIG. 9 is a longitudinal sectional view of a motor capable of making a rotational motion and an axial motion.

The operation for winding one film frame in the operation for driving the driven systems in the mechanism of the first or second embodiment will be described with reference to the flowchart of FIG. 8.

In the ordinary state, the output shaft 1a or 21a of the motor 1 or 21 is at the thrust end in the direction SA as shown in FIG. 1 or 4, and the pinion 2 or 22 is in engagement with the first driven gear 4 or 2 of the barrel frame zooming mechanism.

To wind the film one frame, the output shaft 1a or 21a of the motor 1 or 21 is moved in the direction SB (see FIG. 1 or 4) corresponding to the film feed system driving state (Step S100) to bring the pinion 3 or 22 into engagement with the driven gear 5 or 25.

Next, the motor 1 or 21 is rotated in the direction for driving the film winding mechanism 17 (Step S101).

When the output shaft 1a or 21a is moved in the direction SB in Step S100, the pinion 3 or 22 can be fully engaged with the gear 5 or 25 if the teeth of the pinion 3 or 33 are moved in a phase relationship with those of the drive gear 5 or 25 such as to not to interfere with the same. If interference between the teeth occurs during the movement, these gears are engaged as described below. When in Step S101 the motor 1 or 21 rotates slightly to establish such a phase relationship that the interference between the gears is reduced to some extent, the urging force in the direction SB acts on the slanted surfaces provided on the pinion 3 or 22 and the driven gear 5 or 25 to establish a state in which the two gears can be engaged. When a completely engaged state is established, the pinion 3 or 22 is set at the position 3B or 22B.

By the rotation of the motor 1 or 21, the film winding operation is started and a determination is made as to whether the switch 1K has been on (Step S102). The motor 1 or 21 continues rotating until the switch 1K is turned on. When the switch 1K is turned on, the motor 1 or 21 is braked (Step S103) and the motor 1 or 21 is turned off (Step S104), thereby completing the film winding operation.

Thereafter, the motor output shaft 1a or 21a is returned to the initial position in the direction SA of FIG. 1 or 4 (Step S105), and the process returns to a main routine.

The driving force transmission mechanisms of the first and second embodiment have been described with respect to an application to drive systems for film winding, rewinding and lens barrel frame zooming. However, the driving force transmission mechanism of the present invention is not limited to this application. For example, it can be applied to drive systems for shutter driving, barrier opening and closing, zooming movement of an automatic focusing lens, strobe changing, panoramic frame changing and other operations.

As described above, in the driving force transmission mechanism of the present invention, driving of a plurality of drive systems can be performed by changing the drive systems with a motor capable of driving an output shaft by rotating or axially moving the same without using any special changeover mechanism such as that used in the conventional driving force transmission mechanism. Consequently, the total number of component parts of the camera can be reduced, which is advantageous in terms of manufacturing cost. Also, a smaller camera can be designed by using the driving force transmission mechanism of the present invention, since the space occupied by the mechanism can be reduced.

What is claimed is:

1. A driving force transmission mechanism for a camera comprising: an electric drive source having an output shaft movable in an axial direction, said output shaft being capable of being selectively maintained at one of at least two positions in the axial direction, said output shaft being rotatable about its axis at each of said positions;

axial position control means for determining an axial position of said electric drive source output shaft; and driven means disposed at said axial positions of said output shaft, said driven means being driven by receiving a torque of rotation of said electric drive source when said output shaft is at a position associated with the driven means to receive a driving force.

2. A driving force transmission mechanism according to claim 1, wherein said electric drive source comprises a reversible motor.

3. A driving force transmission mechanism according to claim 1, wherein said driven means comprises a film feed mechanism and a zooming mechanism.

4. A driving force transmission mechanism according to claim 1 further comprising coupling means on said output shaft for coupling each driven means to said output shaft.

5. A driving force transmission mechanism for a camera comprising:

an electric drive source having an output shaft movable in an axial direction, said output shaft being capable of being selectively maintained at one Of at least two positions in the axial direction, said output shaft being rotatable about its axis at each of said positions;

driven means disposed at said axial positions of said output shaft of said electric drive source, said driven means being driven by receiving a torque of rotation of said electric drive source when said output shaft is at a position associated with the driven means to receive a driving force; and control means for determining an axial position of said electric drive means and for rotating said output shaft of said electric drive source to drive said driven means.

6. A driving force transmission mechanism according to claim 5, wherein said electric drive source comprises a reversible motor.

7. A driving force transmission mechanism according to claim 5, wherein said driven means comprises a film feed mechanism and a zooming mechanism.

8. A driving force transmission mechanism according to claim 4 further comprising coupling means on said output shaft for coupling each driven means to said output shaft.

9. A driving force transmission mechanism for a camera comprising:

an electric drive source having an output shaft movable in an axial direction, said output shaft being capable of being selectively maintained at one of at least two positions in the axial direction, said output shaft being rotatable about its axis at each of said positions;

driven power transmission means disposed at said axial positions of said output shaft of said electric drive source, said driven power transmission means being driven by receiving a torque of rotation of said electric drive source when said output shaft is at a position associated With the driven means to receive a driving force; and control means for determining an axial position of said output shaft and for rotating said output shaft of said electric drive source to drive one Of said driven power transmission means.

10. A driving force transmission mechanism according to claim 9, wherein said electric drive source comprises a reversible motor.

11. A driving force transmission mechanism for a camera comprising:

an electric drive source having an output shaft movable in an axial direction, said output shaft being capable of being selectively maintained at one of at least two positions in the axial direction, said output shaft being rotatable about its axis at each of said positions;

driven power transmission means disposed at positions corresponding to said axial positions of said output shaft of said electric drive source, said driven power transmission means being driven by receiving a torque of rotation of said electric drive source;

coupling means for selectively coupling said output shaft and said driven power transmission means; and control means for determining the axial position of said electric drive means, for coupling said output shaft and One of said driven power transmission means through said coupling means and for rotating said output shaft of said electric drive source to drive said one of said driven power transmission means.

12. A driving force transmission mechanism according to claim 11, wherein said electric drive source comprises a reversible motor.

13. A driving force transmission mechanism for a camera comprising:

an electric drive source having an output shaft movable in an axial direction, said output shaft being capable of being selectively maintained at one of at least two positions in the axial direction, said output shaft being rotatable about its axis at each of said positions;

driven means disposed at positions corresponding to said axial positions of said output shaft of said electric drive source, said driven means being driven by receiving a torque of rotation of said electric drive source;

coupling means for coupling said output shaft and said driven means; and control means for determining an axial position of said electric drive means, for coupling said output shaft and one of said driven means through said coupling means and for rotating said output shaft of said electric drive source to drive said one of said driven means.

14. A driving force transmission mechanism according to claim 13, wherein said electric drive source comprises a reversible motor.

15. A driving force transmission mechanism according to claim 13, wherein said driven means comprises a film feed mechanism and a zooming mechanism.

16. A driving force transmission mechanism for a camera comprising:

a motor capable of rotationally driving its output shaft and capable of axially driving its output shaft along an axial direction of the output shaft;

a plurality of driven systems;

selecting at least one of said driven systems by moving said output shaft of said motor along the axial direction; and means for transmitting a driving force to the selected driven system selected by rotationally driving said output shaft.

17. A driving force transmission mechanism for a camera comprising:

a motor provided in a camera body, said motor being capable of rotationally driving its output shaft and capable of axially driving its output shaft along an axial direction of the output shaft;

at least one output gear coaxially fixed to said output shaft, said output gear being rotated by rotational driving of said output shaft, said output gear being moved to a plurality of positions in the axial direction by axially driving said output shaft;

a plurality of driven gears each capable of meshing with said output gear at one of said plurality of axial positions, each of said driven gears being driven by rotation of said output gear when in meshing engagement with said output gear; and a plurality of driven systems driven by rotation of said plurality of driven gears to execute predetermined operations in a camera.

18. A driving force transmission mechanism according to claim 17, wherein said output gear has gear teeth and at least one slanted surface is formed in an end surface of each of the teeth of said output gear at least at one axial end of said teeth by being inclined with respect to an axial direction of said output gear.

19. A driving force transmission mechanism for a camera comprising:

a motor provided in a camera body, said motor being capable of rotationally driving its output shaft and capable of axially driving its output shaft along an axial direction of the output shaft;

at least one output gear coaxially fixed to said motor output shaft, said output gear being rotated by rotational driving of said output shaft, said output gear being movable at least to first and second positions in the axial direction by axial driving of said output shaft;

a first driven gear meshing with said output gear to be driven by rotation of said output gear when said output gear is at said first position;

a second driven gear meshing with said output gear to be driven by rotation of said output gear when said output gear is at said second position; and a plurality of driven systems driven by rotation of said first and second driven gears to execute predetermined operations in the camera.

20. A driving force transmission mechanism according to claim 19, wherein said output shaft projects from one of two end surfaces of a motor body.

21. A driving force transmission mechanism according to claim 19, wherein said first driven gear drives a lens barrel, while said second driven gear drives a film feed mechanism.

22. A driving force transmission mechanism according to claim 21, wherein said film feed mechanism includes a planetary gear mechanism for selectively performing winding and rewinding operations.

23. A driving force transmission mechanism for a camera comprising:

a motor provided in a camera body;

an output shaft projecting from both end surfaces of said motor, said output shaft being capable of being moved by rotational driving and axial driving;

a first output gear coaxially fixed to a portion of said output shaft projecting from one end surface of said motor, said first output gear being capable of being moved by rotational driving and axial driving;

a second output gear coaxially fixed to a portion of said output shaft projecting from the other end surface of said motor, said second output gear being capable of being moved by rotational driving and axial driving;

a first driven gear meshing with said first output gear to be driven by rotation of said first output gear when said output shaft is at a first position;

a second driven gear meshing with said second output gear to be driven by rotation of said second output gear when said output shaft is at a second position; and a plurality of driven systems driven by rotation of said first and second driven gears to execute predetermined operations in the camera.

24. A driving force transmission mechanism according to claim 23, wherein said first driven gear drives a lens barrel, while said second driven gear drives a film feed mechanism.

25. A driving force transmission mechanism according to claim 24, wherein said film feed mechanism includes a planetary gear mechanism for selectively performing winding and rewinding operations.

26. A method for operating a driving force transmission mechanism comprised of a motor having an output shaft which is axially movable and rotatable, a gear coupled to one end of said output shaft and a pair of driven gears located at spaced positions, said method comprising the steps of:

(a) determining an axial position of said output shaft;

(b) axially moving the output shaft to a position to bring said output gear in meshing engagement with one of said driven gears responsive to an operation request associated with the selected driven gear; and (c) rotating said output shaft in a direction according to the selected operation.

27. The method of claim 26 wherein said output gear has gear teeth provided with beveled ends thereof and said driven gears have gear teeth which are beveled at at least one of their ends, said method further comprising the step of rotating the output shaft slightly as it is being axially moved in order to aid the output gear and selected driven gear to come into proper meshing engagement.

28. A method for operating a driving force transmission mechanism comprised of a motor having an output shaft which is axially movable and rotatable, said output shaft extending beyond opposite ends of said motor, an output gear coupled to each end of said output shaft and a pair of driven gears located near each end of the motor, said method comprising the steps of:

(a) determining an axial position of said output shaft;

(b) axially moving the output shaft to a position to bring one of said output gears in meshing engagement with an associated one of said driven gears responsive to an operation request associated with the selected driven gear; and (c) rotating said output shaft in a direction according to the selected operation.

29. The method of claim 28 wherein each of said output gears having gear teeth provided with beveled ends thereof at one end of the gear teeth and said driven gears having gear teeth which are beveled at at least one of their ends, said method further comprising the step of rotating the output shaft slightly as it is being axially moved in order to aid the selected driven gear and its associated output gear to come into proper meshing engagement.

* * * * *